H. LUTSKY.
AUXILIARY FUEL TANK FOR MOTOR VEHICLES.
APPLICATION FILED JULY 15, 1920.
1,398,334.
Patented Nov. 29, 1921.
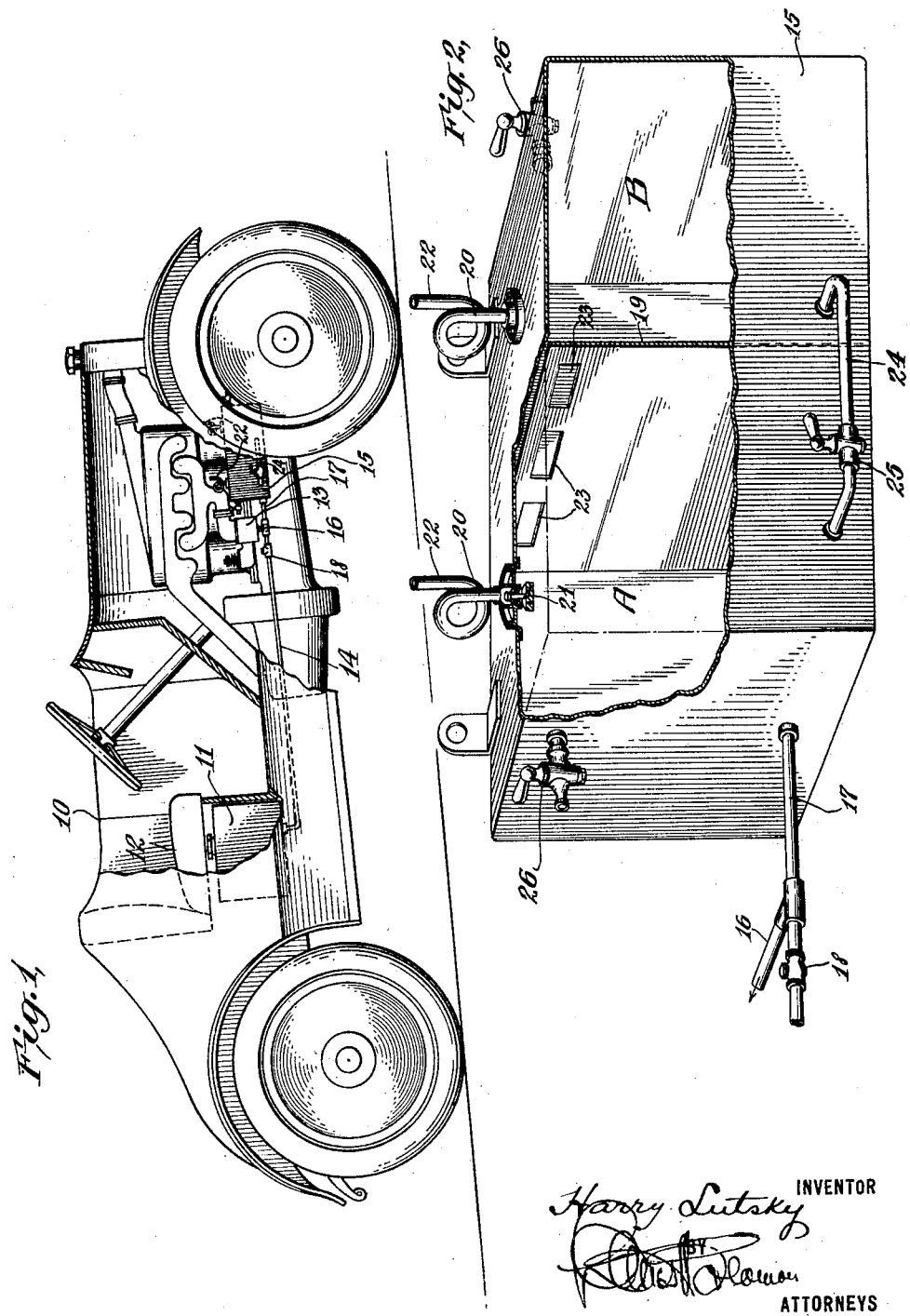

UNITED STATES PATENT OFFICE.

HARRY LUTSKY, OF STAPLETON, NEW YORK.

AUXILIARY FUEL-TANK FOR MOTOR-VEHICLES.

1,398,334.　　　　　Specification of Letters Patent.　　Patented Nov. 29, 1921.

Application filed July 15, 1920. Serial No. 396,573.

*To all whom it may concern:*

Be it known that I, HARRY LUTSKY, a citizen of the United States, and resident of Stapleton, in the county of Richmond and State of New York, have invented certain new and useful Improvements in Auxiliary Fuel-Tanks for Motor-Vehicles, of which the following is a specification.

This invention relates to auxiliary fuel tanks for motor vehicles, and is particularly directed to the provision of such a tank adapted to serve both as a supplementary pressure tank when the vehicle is traveling up an incline, and as a reserve tank in which an additional supply of fuel for emergencies is stored.

One of the difficulties encountered in the driving of certain automobiles, such as Fords, in which the gasolene tank is located near the level of the engine and gravity feed is employed, is the failure of the fuel to feed to the carbureter when the vehicle is traveling up grade and the tank is therefore at a lower level than the carbureter.

One object of my invention is to avoid this difficulty by supplying an auxiliary tank so located that it will supply fuel to the carbureter under the conditions indicated. A further object is to provide a tank of this type which is automatically replenished from the main tank when the vehicle is not traveling up-hill. In the specific form I have accomplished this object by connecting the tank directly to the main gasolene line with the carbureter, positioning the tank in such a way that it will be filled by gravity.

Another common difficulty encountered by automobilists is the unexpected failure of the fuel supply. This has heretofore been met by the provision of various auxiliary storage devices; and another object of my invention is to provide such an auxiliary storage tank which is so located and arranged that it will be automatically filled and maintained full by the supply from the main tank, although located at a distance therefrom, and so arranged that the reserve supply of fuel stored in such auxiliary tank may be directed to the carbureter simply by the turning of a suitable valve.

Another object is to provide a tank of this type which may be readily mounted on or adjacent to the engine, taking up space otherwise unoccupied, and adapted to be attached to automobiles now in use with a minimum of difficulty.

A principal object of my invention, moreover, is to provide a single auxiliary tank which will combine the characteristics of the supplemental pressure type with those of the reserve storage type. I have also devised a tank of this kind in which a single connection to the main gasolene line is employed for both the extra pressure and the reserve supply.

Other objects and advantages of my construction will be apparent from the following description, taken in connection with the accompanying drawings, in which:

Figure 1 is a somewhat diagrammatic side elevation of a motor vehicle with the tank installed therein, and Fig. 2 is a perspective view of a preferred form of tank, parts being broken away.

In the automobile 10 shown in Fig. 1, which is of the Ford type, the main gasolene tank 11 is located beneath the seat 12 not much above the level of the carbureter 13 with which it is connected by a supply line or pipe 14. In the usual construction of the engine in Fords and other well known makes of automobiles, there is a substantial space forward of the carbureter between the side of the engine block and the hood. I preferably mount my tank, indicated generally at 15, in this space in any preferred way; though obviously other suitable locations may be employed, depending upon particular requirements or tastes. In this location, however, the tank is readily accessible, easily mounted in position, and does not interfere with access to any of the working parts. Tank 15 is connected to the gasolene line 14, or to the carbureter, in any desired way, as by providing a T connection 16 in the line 14, into which the tank pipe 17 leads. With this arrangement, it will be evident that when the vehicle is running up hill and the level of the gasolene in tank 11 is below carbureter 13, the gasolene from tank 15 will flow through pipe 17 into the carbureter 13. To prevent flow from the tank 15 into the main line 14, I may employ a check valve 18 of any suitable type.

In the preferred form, in which tank 15 contains both a pressure and a reserve supply I prefer to employ a unitary tank as shown in Fig 2, divided by a partition 19 into two compartments, a chamber A at the left containing the pressure supply, and the chamber B at the right being used in the storage of the reserve supply. A pipe 17 is connected with the lower part of the pressure chamber A, the arrangement being such that when the vehicle is in horizontal position, the gasolene flowing from tank 11 will pass through piping 17 into the pressure chamber A, filling it at the same time that a supply is furnished to the carbureter 13. When the front of the vehicle is raised, as in climbing a hill, the supply in the pressure chamber will be depleted; but upon reaching level ground again the chamber A will immediately be refilled from tank 11 without any attention on the part of the driver.

In order to facilitate the ready filling and emptying of the pressure compartment A, I may provide a suitable air vent 20 which may be provided with a float valve 21, closing when the tank is full to prevent escape of the fuel through the vent, though obviously the vent pipe 22 may be carried upwardly far enough to avoid any danger of the escape of fuel.

The reserve chamber B is normally entirely closed except for a connection between the upper part of said chamber and the upper part of the pressure chamber A. I prefer to make such connection by providing ports 23 in partition 19 adjacent the upper end thereof, so that the liquid fuel will flow through ports 23 when the pressure chamber A is filled until chamber B is also filled up to the level of such ports. When, however, the pressure chamber A is drained during the ascent of a grade, the reserve supply in chamber B will be unaffected, as it will remain substantially at the level of the bottom of ports 23. When such supply is needed, I provide a connection between the chamber B and the carbureter 13 of any preferred type, adapted to be opened to permit the fluid to run from chamber B to said carbureter.

One highly convenient arrangement for this purpose includes the employment of a pipe connection 24 between the lower part of chamber B and the lower part of chamber A, said pipe 24 being provided with means, such as valve 25, whereby the connection may be closed or opened at will. Valve 25 is normally closed, but can readily be opened by the driver when the reserve supply is needed, no other manipulation being necessary.

It will also be apparent that with this specific connection tanks A and B may both be employed as pressure tanks by maintaining valve 25 in open position, thus preventing stoppage on a long hill where the capacity of tank A would be insufficient, and permitting the employment of a tank A smaller than might otherwise be desirable. Furthermore, with this arrangement a single connection between compartments A and B and the carbureter 13 is sufficient.

Suitable drainage and test cocks may of course be employed, the test cocks 26 being intended to permit the driver to ascertain when the compartments A and B are filled.

The operation of the device will be apparent from the foregoing description, from which it will readily be seen that I have provided not only an extremely compact and simple construction, but also one which will require the minimum of attention, as it requires no filling and is entirely automatic in its action, save for the release of the reserve supply; and it has been found most desirable in practice to provide manual release for this reserve.

I am aware that auxiliary pressure tanks and reserve supply tanks separately are old, and I do not claim either broadly; but my invention resides partly in the specific improvements in construction and location of tanks of each type set forth above, and partly in the combination of such tanks in a single structure.

While I have described the preferred form of my invention and indicated certain variations therein, it will be apparent that numerous other changes may be made within the scope of my invention as set forth in this specification.

I claim:

1. An auxiliary fuel system for motor vehicles provided with a main fuel tank connected by a pipe line to a carbureter, including a reserve tank mounted forward of the carbureter and connected to said pipe line to receive a fuel charge from the main tank and to deliver such charge to the carbureter, said reserve tank comprising a receptacle provided with a vertical partition separating the tank into a pressure compartment and a storage compartment, the partition being provided with passages adjacent the upper portion thereof functioning as filling openings for the storage compartment and means connecting the compartments at a point adjacent their bottoms to provide for filling the storage compartment from the pressure compartment and for discharging the storage compartment into the pressure compartment; the said means comprising a by-pass mounted externally of the receptacle and a valve in said by-pass, the arrangement being such as to provide a construction in which the storage compartment may be alternatively used as a storage or pressure chamber.

2. A fuel system for motor vehicles, in combination, a main fuel tank, a carbureter, a pipe line connecting the main tank with the carbureter, a valve in said pipe line, a reserve fuel tank mounted forward of the carbureter and below the normal level of the main tank, means connecting the reserve tank with the said pipe line at a point in advance of the said valve, the reserve tank comprising a receptacle provided with a vertical partition separating the tank into a pressure compartment and a storage compartment, the partition being provided with passages adjacent the upper portion thereof functioning as filling openings for the storage compartment and means connecting the compartments at a point adjacent their bottoms to provide for filling the storage compartment from the pressure compartment and for discharging the storage compartment into the pressure compartment, the said means comprising a by-pass mounted externally of the receptacle and a valve in said by-pass, the arrangement being such as to provide a construction in which the storage compartment may be alternatively used as a storage or pressure chamber.

Signed at New York city, in the county of New York and State of New York, this 10th day of July, A. D. 1920.

HARRY LUTSKY.